US009453982B2

(12) United States Patent
Nhep et al.

(10) Patent No.: US 9,453,982 B2
(45) Date of Patent: Sep. 27, 2016

(54) PULLING GRIP ASSEMBLY

(71) Applicant: ADC Telecommunications, Inc., Berwyn, PA (US)

(72) Inventors: Ponharith Nhep, Savage, MN (US); Christopher E. Raynor, Holly Springs, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/738,295

(22) Filed: Jun. 12, 2015

(65) Prior Publication Data
US 2015/0362693 A1 Dec. 17, 2015

Related U.S. Application Data

(60) Provisional application No. 62/011,457, filed on Jun. 12, 2014, provisional application No. 62/097,636, filed on Dec. 30, 2014.

(51) Int. Cl.
*G02B 6/46* (2006.01)
*G02B 6/44* (2006.01)

(52) U.S. Cl.
CPC ........... *G02B 6/4465* (2013.01); *G02B 6/4471* (2013.01); *G02B 6/4422* (2013.01)

(58) Field of Classification Search
USPC ....................................................... 385/100
See application file for complete search history.

(56) References Cited

U.S. PATENT DOCUMENTS

| | | |
|---|---|---|
| 4,684,211 A | 8/1987 | Weber et al. |
| 5,133,583 A | 7/1992 | Wagman et al. |
| 5,863,083 A | 1/1999 | Giebel et al. |
| 6,993,237 B2 | 1/2006 | Cooke et al. |
| 8,620,130 B2 | 12/2013 | Cooke et al. |

(Continued)

FOREIGN PATENT DOCUMENTS

| | | |
|---|---|---|
| DE | 102004019805 | 11/2015 |
| EP | 2159616 | 5/2013 |
| WO | WO 2008/091482 | 7/2008 |

OTHER PUBLICATIONS

FTAA Pulling Grip, Assembly Instructions, TECP-90-468, Issue 1, May 2014; 300001764950 Rev A; Tyco Electronics Corporation, 10 pp.
Pulling Grip IP, FTTA. IP; TE, Feb. 6, 2014, 6 pp.

(Continued)

*Primary Examiner* — Eric Wong
(74) *Attorney, Agent, or Firm* — Merchant & Gould P.C

(57) ABSTRACT

Teachings of the present disclosure relate to a pulling sleeve for pulling a cable through a conduit. The pulling sleeve is mounted over fibers of a fiber optic cable and a plurality of fiber optic connectors associated with the fibers. The pulling sleeve includes an elongated body formed of two mating pieces to include an interior cavity to receive and house the fibers. The two mating pieces may include half-pieces. The elongated body of the pulling sleeve includes a length that extends along a central axis between first and second ends, where the first end of the elongated body includes a pulling eye. Also, the elongated body of the pulling sleeve defines a plurality of axially spaced-apart circumferential notches for enhancing flexibility along its length. The axially spaced-apart circumferential notches enable the elongated body of the pulling sleeve to conform to a curved conduit path.

13 Claims, 8 Drawing Sheets

(56) References Cited

U.S. PATENT DOCUMENTS

2010/0052346 A1* 3/2010 Cooke .................. G02B 6/4465
294/86.4
2012/0248392 A1 10/2012 Allen et al.

OTHER PUBLICATIONS

FTTA, IP; TE, Feb. 6, 2014, 4 pp.
1000096790-PDM, FTTA, Pulling Grip Drawing; TE, Mar. 10, 2014, 2 pp.

* cited by examiner

PULLING GRIP ASSEMBLY

CROSS REFERENCE TO RELATED APPLICATIONS

This application claims the benefit of provisional application Ser. No. 62/011,457, filed Jun. 12, 2014 and of provisional application Ser. No. 62/097,636, filed Dec. 30, 2014, which applications are incorporated herein by reference in their entirety.

TECHNICAL FIELD

The present disclosure relates generally to a pulling tool for installing fiber optic cable.

BACKGROUND

Pulling assemblies are commonly used to install fiber optic cable by pulling the fiber optic cable along a desired cable routing path. Often, the fiber optic cable is pulled through a conduit (e.g., a pipe, duct, plenum, riser, etc.) that may be indoor (e.g., in a building) or outdoor (e.g., above or below ground). In other applications, the fiber optic cable is pulled up a structure such as a radio tower with or without being routed through a conduit. Example cable pulling systems are disclosed at U.S. Pat. Nos. 6,993,237 and 5,863,083. Improvements in the area of strength, flexibility and the ability to traverse tortuous paths are desired.

SUMMARY

Teachings of the present disclosure relate to a pulling sleeve for use in installing a cable (e.g., a fiber optic cable) by pulling the cable along a routing path. The pulling sleeve can be mounted over fibers of a fiber optic cable and a plurality of fiber optic connectors associated with the fibers. The pulling sleeve can include an elongated body formed of two mating pieces to include an interior cavity to receive and house the fibers of the fiber optic cable. The two mating pieces may include half-pieces.

In certain examples, the elongated body of the pulling sleeve includes a length that extends along a central axis between first and second ends, where the first end of the elongated body includes a pulling eye. The first end may be tapered. Also, the elongated body of the pulling sleeve may define a plurality of axially spaced-apart circumferential notches for enhancing flexibility along its length. The elongated body of the pulling sleeve may be sufficiently flexible to flex at ninety degrees on a twenty-four inch radius without failure. The axially spaced-apart circumferential notches enable the elongated body of the pulling sleeve to conform to a curved routing path (e.g., within a conduit).

The pulling sleeve may define circumferential grooves for receiving cable ties or any other tying structure for holding the mating pieces together. The elongated body of the pulling sleeve may have an axial pulling strength of at least three hundred pounds. Also, the elongated body of the pulling sleeve may have a compressive strength of at least two hundred and fifty pounds per square inch. In addition, the elongated body of the pulling sleeve may have a polymeric construction to form the mating surfaces. In certain examples, a fan-out may be secured to the cable. The optic fibers terminated by the fiber optic connectors may form connectorized pigtails that extend from the fan-out. The fan-out may be mounted within the elongated body adjacent to the second end of the elongated body.

The circumferential notches may each extend completely radially through a wall of the elongated body and about the circumference of the elongated body that extend around the central axis. The notches may extend slightly less than one hundred and eighty degrees about the circumference. Also, the notches may be located axially adjacent to one another and subsequently overlap. Furthermore, the axially adjacent notches may be at least partially circumferentially offset from one another.

Aspects of the present disclosure relate to a pulling tool for pulling a telecommunications cable such as a fiber optic cable with a fiber optic connector at the end thereof. In certain examples, the pulling tool covers fiber optic connectors and unjacketed optical fibers at the end of the fiber optic cable, and adequately grips the fiber optic cable without crushing the connectors or the optical fibers. Aspects of the present disclosure relate to a pulling tool that can be quickly and easily attached to a pulling line (e.g., a wire, cable, or other elongate pulling member). Aspects of the present disclosure relate to provide a pulling tool that is relatively inexpensive to manufacture and relatively simple to use.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the examples disclosed herein are based.

BRIEF DESCRIPTION OF THE DRAWINGS

The accompanying drawings, which are incorporated in and constitute a part of this disclosure, illustrate various examples of the present disclosure. In the drawings.

DETAILED DESCRIPTION

Figure 1:
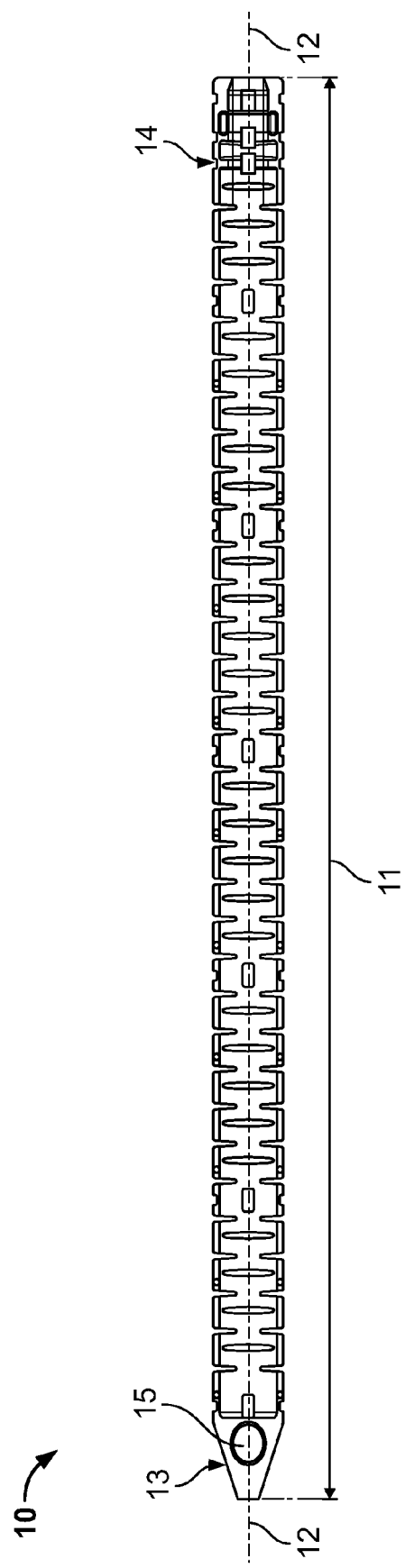
FIG. 1 is a perspective view of a pulling sleeve in accordance with the principles of the present disclosure.

The present disclosure relates to a pulling sleeve for pulling a plurality of optical fibers through a conduit. In certain examples, various teachings herein relate to a cable, such as, for example, a fiber optic cable. The fiber optic cable includes a main jacket enclosing a plurality of optical fibers. The fiber optic cable typically includes strength members such as aramid yarns. A fan-out (i.e., a break-out) is mounted to the end of the main cable jacket and the strength members of the fiber optic cable are anchored to the fan-out. In the fan-out, the optical fibers are separated from one another and routed into separate pigtails. Each pigtail includes a fiber optic connector that terminates the corresponding optical fiber of the pigtail. Each pigtail also includes a furcation tube/buffer tube that protects the optical fiber of the pigtail and extends from the fan-out to the fiber optic connector. The pigtails can also include strength members within the furcation tubes. The strength members provide tensile strength to the pigtails and are connected at one end to the fan-out and at the other end to each connector. The pigtails and the fan-out are housed within the pulling sleeve.

The pulling sleeve is mounted over the pigtails, which include the optical fibers of the fiber optic cable and a plurality of fiber optic connectors associated with each optical fiber. The pulling sleeve includes an elongated body formed of two mating pieces to include an interior cavity to receive and house the pigtails. In certain examples, the two mating pieces may include half-pieces. The elongated body of the pulling sleeve includes a length that extends along a central axis between first and second ends, where the first end of the elongated body includes a pulling eye. In certain examples, the first end may be tapered. The elongated body of the pulling sleeve defines a plurality of axially spaced-apart circumferential notches for enhancing flexibility along its length.

Teachings of the present disclosure also relate to an elongated body of the pulling sleeve that is sufficiently flexible to flex at ninety degrees on a twenty-four inch radius without failure. Teachings of the present disclosure also relate to axially spaced-apart circumferential notches that enable the elongated body of the pulling sleeve to conform to a curved conduit path. Teachings of the present disclosure also allow for receiving cable ties or any other tying structure for holding the mating pieces together. Circumferential grooves on the pulling sleeve enable cable ties or other tying structures to secure the mating pieces together. The teachings of the present disclosure can also provide an elongated body of the pulling sleeve with an axial pulling strength of at least three hundred pounds. Teachings of the present disclosure also allow for the pulling sleeve with a compressive strength of at least two hundred and fifty pounds per square inch. Teachings of the present disclosure also allow for a polymeric construction configured to form the mating surfaces. Teachings of the present disclosure also allow for mounting the fan-out, which includes the optical fibers separated from one another and routed into separate pigtails, within the elongated body adjacent to the second end of the elongated body.

Another aspect of the present disclosure relates to a method of installing a plurality of pigtails within the pulling sleeve. The method includes the steps of grouping a subset of pigtails from a fan out of the fiber optic cable together to be packaged. Teachings of the present disclosure relate to grouping four optical fibers and their associated four connectors on the four shortest optical fibers to create a pigtail groups. Teachings of the present disclosure also relate to packaging the four optical fibers' associated fiber connectors together and securing the packaging of the subset of fibers with tape or other tying structures. Each pigtail also includes a furcation tube/buffer tube that protects the optical fiber of the pigtail and extends from the fan-out to the fiber optic connector. The pigtails can also include strength members within the furcation tubes. The strength members provide tensile strength to the pigtails and are connected at one end to the fan-out and at the other end to each connector. The remaining pigtails are grouped according to length and packaged and secured as described above to complete the entire fiber optic cable. The grouped pigtails that extend from the fan out, and the fan out are placed within a first mating piece of the pulling sleeve at the second end of the elongated body. The second end of the elongated body is configured to receive the fiber optic cable with the pigtails extended from the fan out located towards the first end of the elongated body. The pigtails are placed within the first mating piece of the elongated body and the pigtails are folded over as needed to secure the pigtails within the first mating piece of the elongated body. A second corresponding mating piece is placed on the first mating piece to secure the fiber optic cable, pigtails, and fan out within the elongated body of the pulling sleeve. The elongated body of the pulling sleeve may be labeled with an indicator to suggest a location for installing the fiber optic cable. The two mating pieces of the elongated body of the pulling sleeve may be secured together by tying cable ties or other tying structures. The cable ties or other tying structures may fit within circumferential grooves along the elongated body of the pulling sleeve.

As used herein, the fiber optic cable includes a first end and an oppositely disposed second end. The second end of the fiber optic cable includes a fan out and connectorized pigtails that extend from the fan out. The fiber optic cable further includes an outer jacket and a strength member disposed in the outer jacket.

Another aspect of the present disclosure relates to a method for pulling fiber optic cable above ground to either a cell tower or a radio tower from a base transceiver station. The fiber optic cable may be pulled up to a service terminal, remote radio unit/head, antennae or other structure mounted on the tower at an elevated height. The method may include the steps of routing the pulling sleeve containing the fiber optic cable, as described in detail below, up a cell tower from a base station or site support cabinet on the ground through a conduit that runs up the side of the cell tower to a point near the remote radio units and corresponding antennas, which can be located over a hundred feet in the air on the cell tower. Alternatively, the pulling sleeve containing the fiber optic cable, may be routed up a cell tower from a base station or site support cabinet on the ground without the use of a conduit.

FIG. 1 depicts a pulling sleeve 10, for pulling a cable through a conduit, including an elongated body 11 that extends along a central longitudinal axis 12 between a first 13 and second 14 ends. The elongated body includes a first 16 and second 17 mating piece. The first end 13 of the elongated body 11 includes a pulling eye 15. The pulling eye 15 defines an aperture through the first 16 and second 17 mating pieces and is perpendicular to the central axis 12. The pulling eye 15 is adapted to receive a pulling member (e.g., a rope, chain, etc.) for pulling the pulling sleeve 10 through a passage. In one embodiment, the first 16 and second 17 mating pieces are manufactured from the same durable material.

The first 16 and second 17 mating pieces may be manufactured from polytheylene terephthalate plastic, polyvinyl chloride plastic, polypropylene plastics, rubber, synthetic rubber, and other known high strength polymers. In one embodiment, the material enables the elongated body 11 of the pulling sleeve to have an axial pulling strength of at least three hundred pounds. In one embodiment, the resin plastic material enables the elongated body 11 of the pulling sleeve 10 to have a compressive strength of at least two hundred and fifty pounds per square inch. In one embodiment, the first end 13 of the elongated body 11 may be tapered to enable burrowing through passageways. In the depicted embodiments of FIG. 1, both the first 16 and second 17 mating pieces are structurally identical. As the first 16 and second 17 mating pieces are structurally identical, only the first mating piece 16 will be described below for ease of description purposes only. It will be understood that the structural features of the first mating piece 16 are included in the second mating piece 17 unless otherwise stated.

Figure 2:
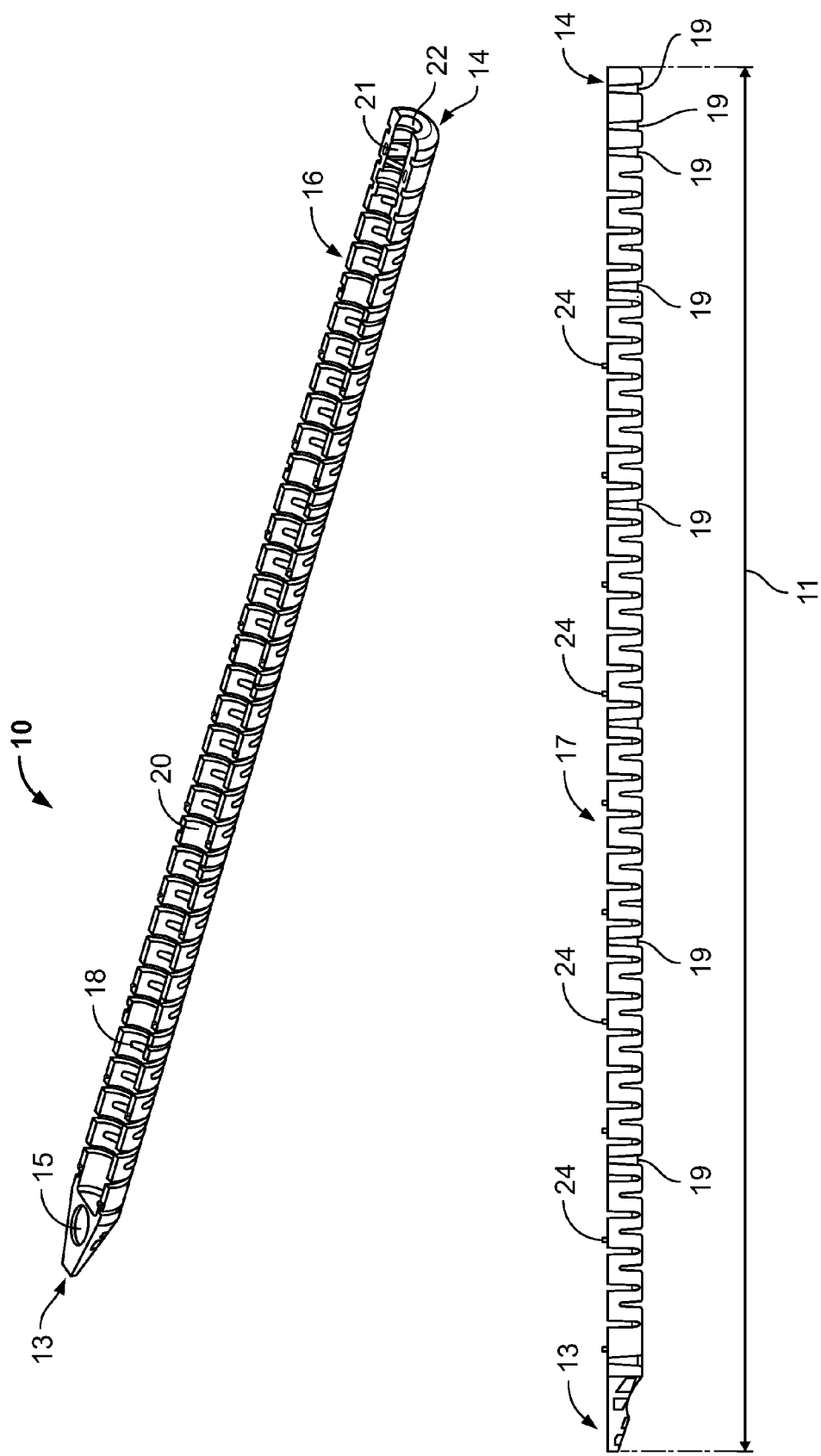
FIG. 2 is a an exploded perspective view of the pulling sleeve.
Figure 3:
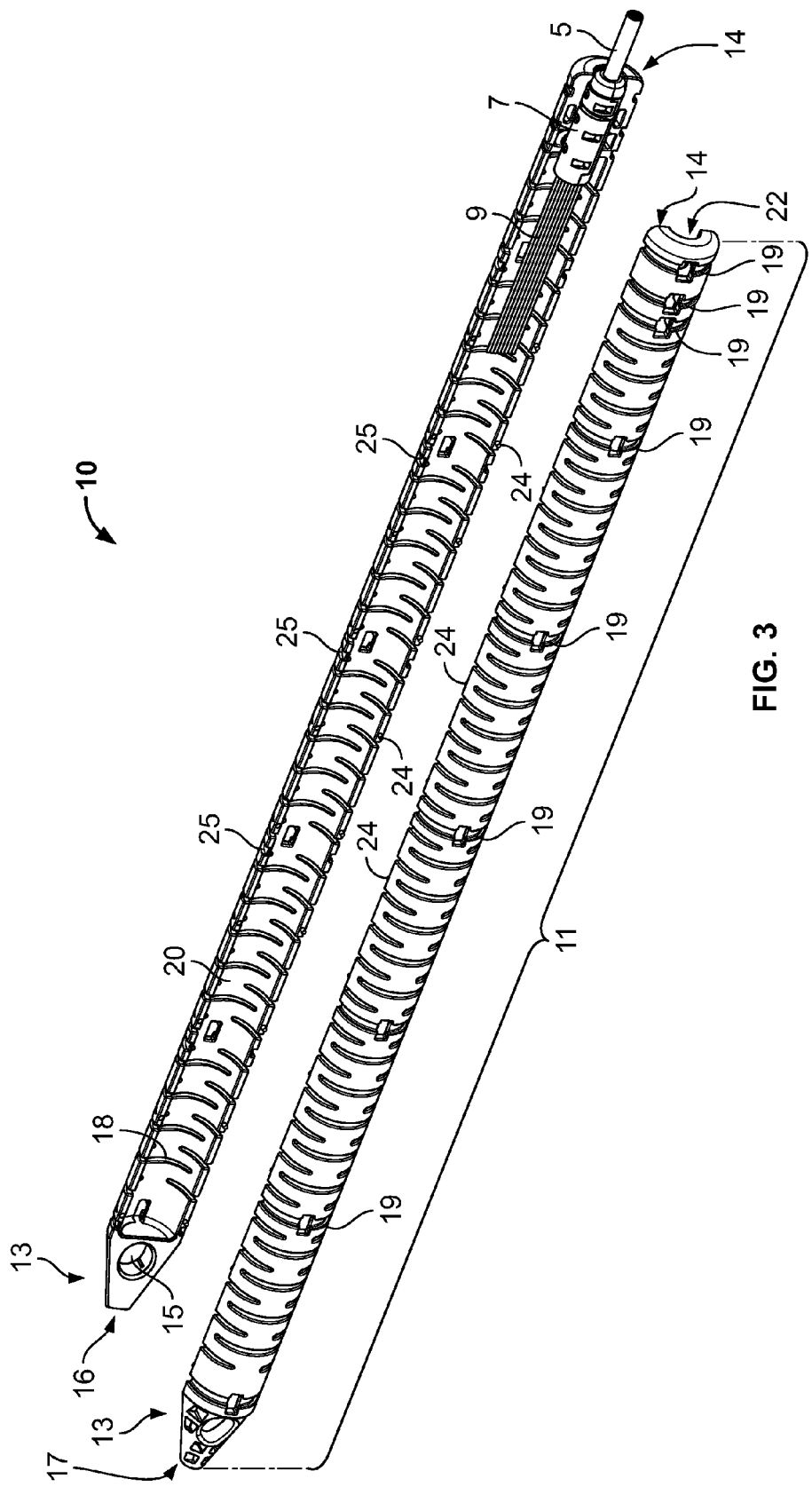
FIG. 3 is an exploded perspective view of the pulling sleeve and optical fibers at an end of a fiber optic cable.
Figure 4:
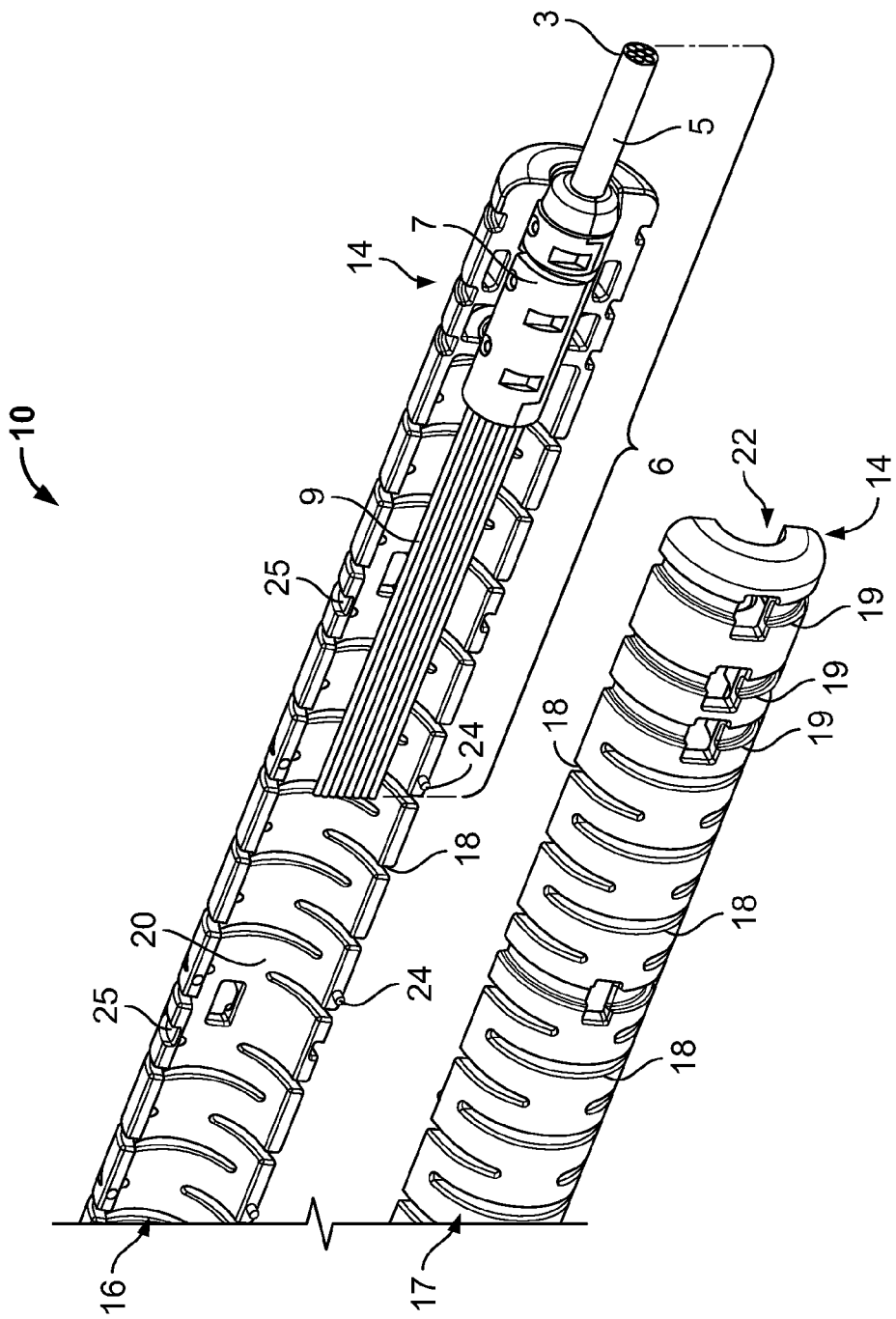
FIG. 4 is a top view of the fiber optic cable and the pulling sleeve.

Referring now to FIGS. 2 and 3, the first mating piece 16 includes an exterior surface and an internal surface. The interior and the exterior surfaces are divided into a plurality of sections by a plurality of axially spaced-apart circumferential notches 18 for enhancing flexibility along its length. The interior surface extends longitudinally between first and second end portions 13, 14 and is generally concave in shape in an orientation about the axis 12. The external surface also extends longitudinally between the first and second end portions 13, 14, and is convex in shape in an orientation about the axis 12. In an embodiment, the axially spaced-apart circumferential notches 18 enable the elongated body 11 of the pulling sleeve 10 to conform to a curved conduit path. In an embodiment, the elongated body 11 of the pulling sleeve 10 may be sufficiently flexible to flex at least ninety degrees on a twenty-four inch radius without failure. In an embodiment, the first mating piece 16 also includes circumferential grooves 19 for receiving cable ties or any other tying structure for holding the first 16 and second 17 mating pieces together. The interior surface is adapted to face a corresponding interior surface of the second mating piece 17 when the first 16 and second 17 mating pieces are engaged. The interior surfaces can be positioned between spaced-apart, parallel longitudinal edge surfaces that are generally planar, and that extend along the length of the sleeve. In one embodiment, the longitudinal edge surfaces of the first mating piece 16 are adapted to abut the corresponding longitudinal edge surfaces of the second mating piece 17 when the first and second mating pieces are engaged.

The elongated body 11 of the pulling sleeve 10 defines an interior cavity 20. The interior cavity 20 is adapted to receive a portion of the end 6 of the fiber optic cable 5. In one aspect of the present disclosure, the interior cavity 20 is configured to receive a fan-out 7 to secure the fiber optic cable 5 while receiving the cable 5 and connectors 8. In one embodiment, optic fibers 9 terminated by the fiber optic connectors are configured to form connectorized pigtails 4 that extend from the fan out 7. The optical fibers 9 are separated from one another and routed into separate pigtails 4. Each pigtail includes a fiber optic connector 8 that terminates the corresponding optical fiber 9 of the pigtail. Each pigtail also includes a furcation tube/buffer tube that protects the optical fiber 9 of the pigtail and extends from the fan-out 7 to the fiber optic connector 8. The pigtails 4 can also include strength members within the furcation tubes. The strength members provide tensile strength the pigtails 4 and are connected at one end to the fan-out 7 and at the other end to each connector 8. The pigtails 4 that extend from the fan out 7, and the fan out 7 are placed within the interior cavity 20 of the first mating piece 16 of the pulling sleeve 10 at the second end 14 of the elongated body 11. The second end 14 of the first mating piece 16 is configured to receive the fiber optic cable 5 with the pigtails 4 extended from the fan out 7 located towards the first end 13 of the first mating piece 16. The fibers 9 and the pigtails 4 are placed within the first mating piece 16 and the pigtails 4 are folded over as needed to secure the pigtails 4 within the first mating piece 16 of the elongated body 11 of the pulling sleeve 10.

The interior cavity 20 of the first mating piece 16 includes an opening 21 configured to receive the portion of the end 6 of the fiber optic cable 5. The interior cavity 20 includes an outlet 22 that extends towards the second end 14 of the first mating piece 16 of the elongated body 11 of the pulling sleeve 10. In one aspect of the present disclosure, the outlet 22 is semi-cylindrical in shape. A complete aperture of the outlet 22 is completed when the first 16 and second 17 mating pieces are aligned. The outlet 22 is adapted to receive a portion of the fiber optic cable 5.

The elongated body 11 of the pulling sleeve 10 defines a plurality of circumferential grooves 19 disposed in the exterior surface of the elongated body 11 of the pulling sleeve 10. The plurality of circumferential grooves 19 include groove openings defined by the longitudinal surface. The plurality of circumferential grooves 19 is disposed along the length of the elongated body 11 of the pulling sleeve 10. In an alternative embodiment, an individual circumferential groove is disposed in the first end 13 of the elongated body 11 of the first mating piece 16 while a second individual circumferential groove is disposed in the second end 14 of the elongated body 11 of the pulling sleeve 10. In an alternative embodiment, a subset of circumferential grooves is disposed at the second end 14 of the elongated body 11 of the pulling sleeve 10 towards the opening 21 and the outlet 22 with a separate subset of circumferential grooves evenly disposed along the length of the elongated body 11 of the pulling sleeve 10.

The first mating piece 16 further includes a plurality of alignment guides 24. In the depicted embodiment of FIGS. 2 and 3, first mating piece 16 includes alignment guides 24 evenly disposed along the length of the elongated body 11 of the pulling sleeve 10. The alignment guides 24 extend perpendicular from the central axis 12. The alignment guides 24 are disposed on opposite sides of the central axis 12. The alignment guides 24 are cylindrical in shape. Opposite the cylindrical shaped alignment guides 24 are alignment openings 25 for the cylindrical shaped alignment guides. The first mating piece 16 defines a plurality of alignment openings 25. The alignment openings 25 of the first mating piece 16 are adapted to receive corresponding alignment guides 24 of the second mating piece 17.

In one embodiment, the first and second mating pieces 16, 17 is pushed toward the other of the first and second mating pieces 16, 17 until the plurality of axially spaced-apart circumferential notches 18 of the first and second mating pieces 16, 17 engage the corresponding plurality of axially spaced-apart circumferential notches 18 of the first and second mating pieces 16, 17. In another embodiment, the first and second mating pieces 16, 17 is pushed toward the other of the first and second mating pieces 16, 17 until the plurality of circumferential grooves 19 of the first and second mating pieces 16, 17 engage the plurality of circumferential grooves 19 of the first and second mating pieces 16, 17.

One of the first and second mating pieces 16, 17 is then pushed toward the other of the first and second mating pieces 16, 17 until the alignment guides 24 and alignment openings 25 of the first and second mating pieces 16, 17 engage the corresponding alignment guides 24 and alignment openings 25 of the first and second mating pieces 16, 17. In one embodiment, the first and second mating pieces 16, 17 are pushed together until an audible clicking sound is heard. The audible clicking sound is produced by the engagement of the alignment guides 24 and alignment openings 25 of the first and second mating pieces 16, 17 to the alignment guides 24 and alignment openings 25 of the first and second mating pieces 16, 17. The engagement between the alignment guides 24 and alignment openings 25 of the first and second mating pieces 16, 17 prevents inadvertent disengagement caused by rotation of one of the first and second mating pieces 16, 17 relative to the other of the first and second mating pieces 16, 17.

After the first and second mating pieces 16, 17 are aligned and fitted together, cable ties or any other tying structure for holding the first 16 and second 17 mating pieces together may be wrapped around the aligned the plurality of circumferential grooves 19. In an embodiment, a pulling member is inserted through the pulling eye 15 defined by an aperture through the first 15 and second 17 mating pieces, perpendicular to the central axis 12. The fiber optic cable 5 can then be pulled to the desired location.

Figure 5:
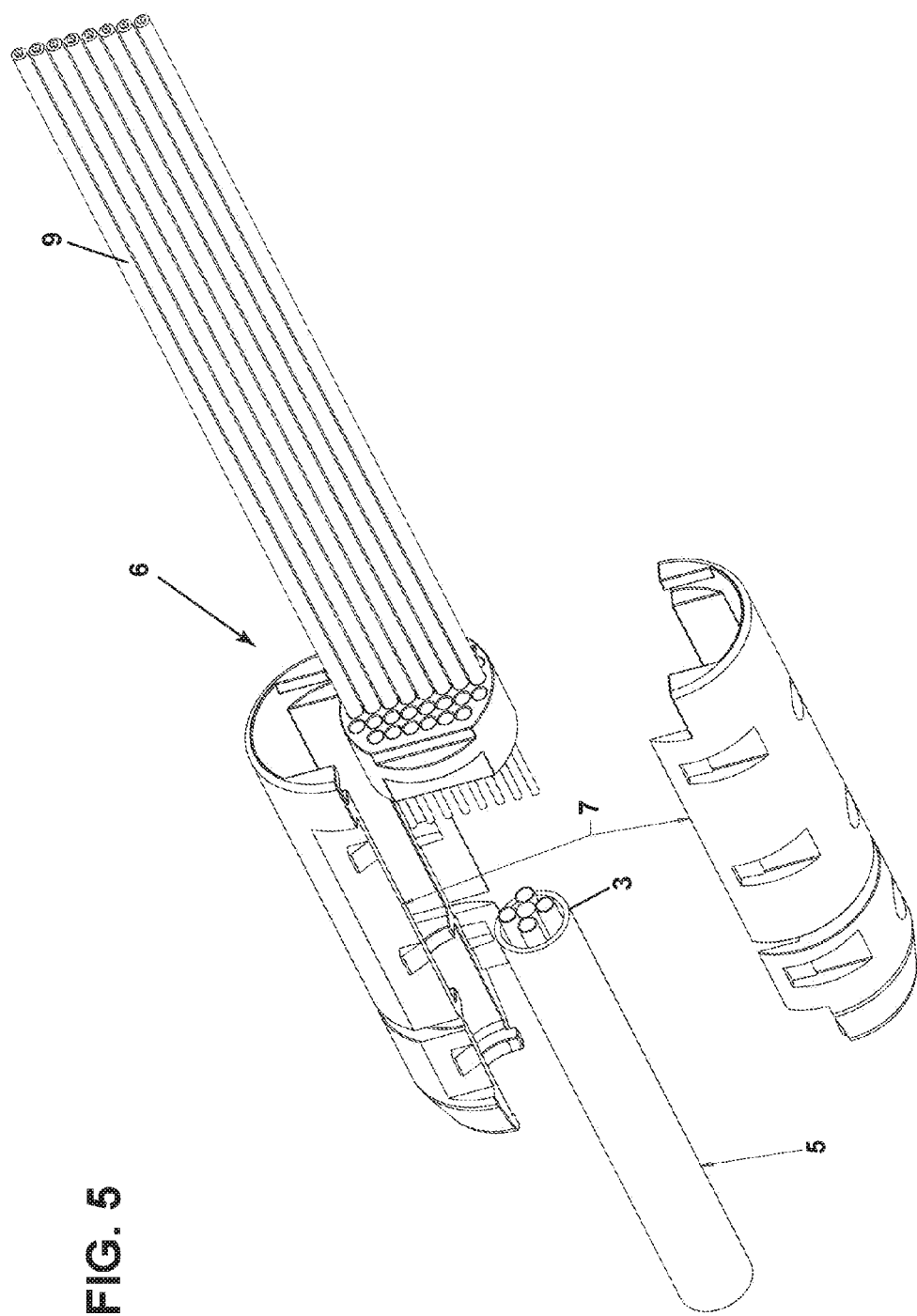
FIG. 5 is a perspective view of the pulling sleeve having exemplary features of aspects in accordance with the principles of the present disclosure.

Referring now to FIG. 5, a fiber optic cable assembly 50 is shown. The fiber optic cable assembly 50 includes a fiber optic cable 5, the optic fibers 9 and the fan-out 7. The fiber optic cable 5 includes an outer jacket 3 that surrounds at least one optical fiber 9. In one embodiment, the fiber optic cable 5 includes a plurality of optical fibers 9. The fiber optic cable 5 includes a first end 13 and an oppositely disposed second end 14. The first end 13 is a terminated end while the second end 14 is an unterminated end. In one embodiment, the first end 13 can be terminated with a multi-fiber optic connectors. In another embodiment, the first end 13 is connected to a fan-out 7 having optical fibers 9 that are terminated by a plurality of single fiber connectors 8.

Referring now to FIGS. 6A-6H, a method for installing the pulling sleeve 10 on the end 6 of the fiber optic cable 5 will be described. In the depicted embodiment of FIG. 5, the outer jacket of the fiber optic cable 5 is stripped from the end 6 of the fiber optic cable 5 to create the fan-out 7. In the fan-out 7, the optical fibers 9 are separated from one another and routed into separate pigtails 4. Each pigtail 4 includes a fiber optic connector that terminates the corresponding optical fiber 9 of the pigtail 4. With the portion of the outer jacket removed from the end 6 of the fiber optic cable 5, the optic fibers 9 are exposed. The end 6 of the fiber optic cable 5 with the optic fibers 9 is inserted through the opening 21 of the interior cavity 20 of the first mating piece 16. With the end 6 of the fiber optic cable 5 disposed in the interior cavity 20 of the first mating piece 16, the optic fibers 9 and fiber optic connectors are contained within the interior cavity 20 of the first mating piece 16 as well. With the optic fibers 9 and fiber optic connectors disposed within the interior cavity 20 of the first mating piece 16, the optic connectors are secured within a plurality of pigtails 4.

Figure 6A:
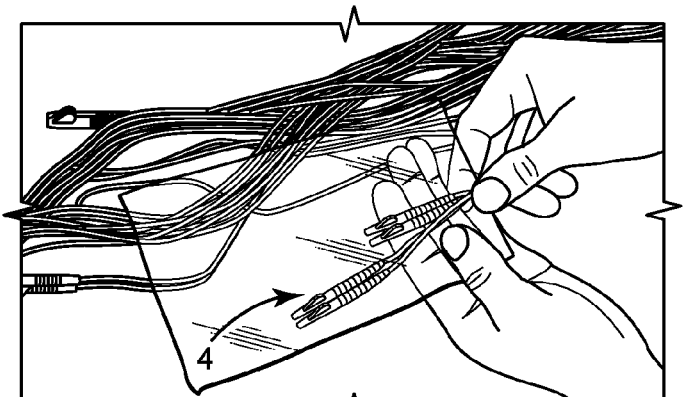
FIGS. 6A-6H is an illustrative method for installing the pulling sleeve on the end of the fiber optic cable.
Figure 6B:
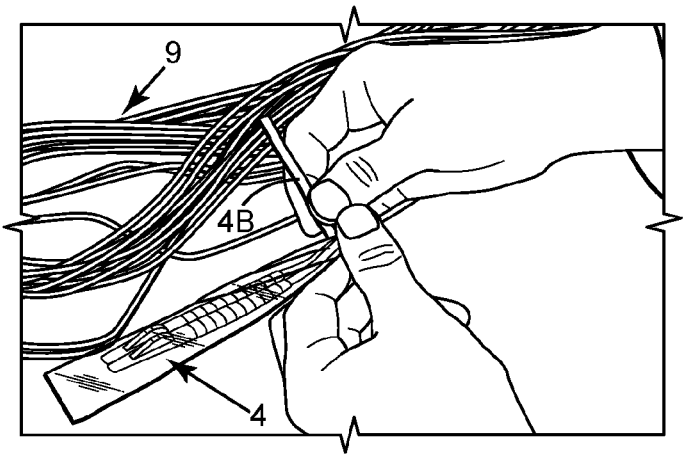
Figure 6C:
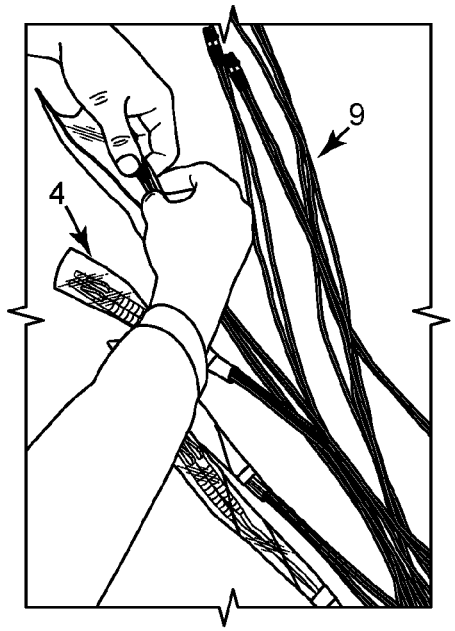
Figure 6D:
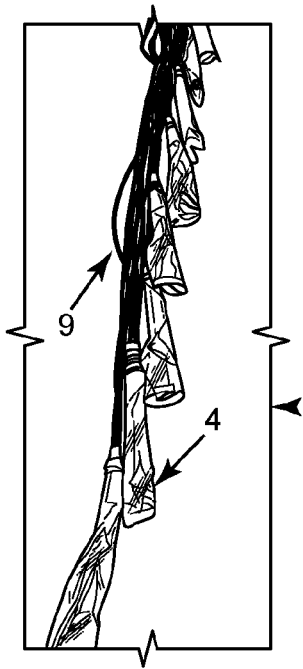

In the depicted embodiment of FIG. 6A, the optic fibers 9 are laid out and bunched together according to length to form a pigtail group 4. In the depicted embodiment of FIG. 6B, the pigtails 4 include a grouping of a subset of the fiber optic connectors 8. For example, every four optic fibers 9 and the corresponding fiber optic connectors are grouped and packaged to create a pigtail group 4. The four optic fibers 9 and the corresponding fiber optic connectors can be packaged within a small bag, plastic wrap, or adhesive. The connectors of the pigtail group are bagged to protect them from moisture/contamination during pulling of the cable. As depicted in FIG. 6B, when the four optic fibers 9 and the corresponding fiber optic connectors are secured within the packaging, the packaging of the subset of optic fibers and fiber optic connectors is secured with tape or other tying structures 4B. The grouping of the optic fibers 9 and the corresponding fiber optic connectors is accomplished strategically. For example, in the case where four optic fibers 9 and the corresponding fiber optic connectors are grouped together, the four shortest optic fibers 9 are grouped together. As indicated in FIG. 6C, the grouping of the optic fibers 9 is continued until all of the optic fibers 9 are secured within pigtail group 4. Grouping the optic fibers 9 to be packaged together within the pigtails 4 by length enables the fan out 7 to be packaged in a manner that will fit securely within the pulling sleeve 10. An exemplary embodiment of the grouped pigtails 4 is indicated in FIG. 6D.

Figure 6F:
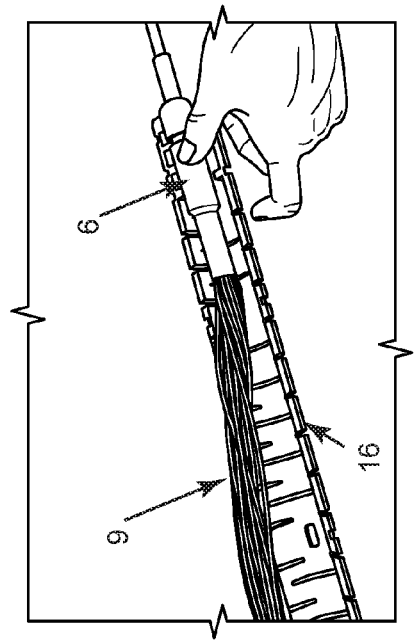
Figure 6H:
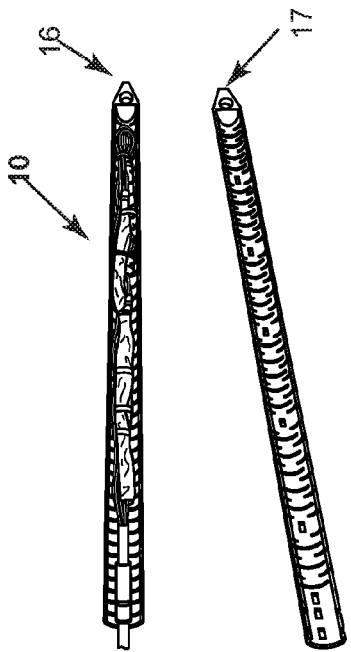
Figure 6E:
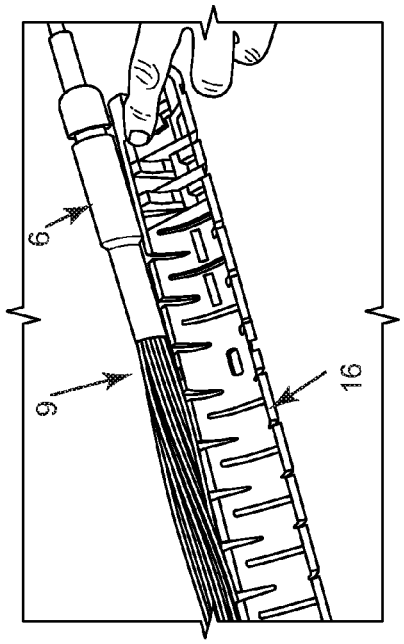
Figure 6G:
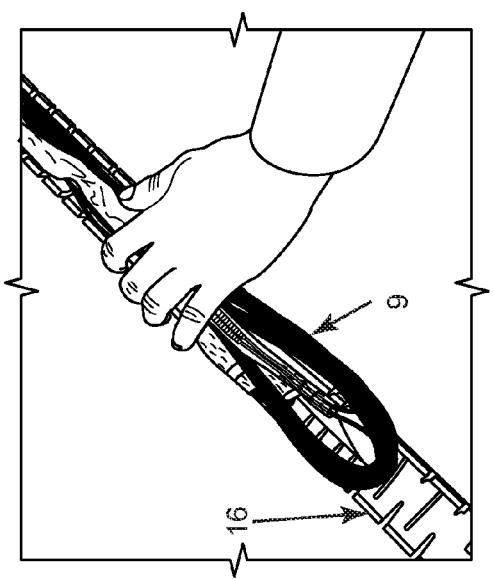

As indicated in FIG. 6E, the fan out 7 is placed within the first mating piece 16 of the pulling sleeve 10. The end 6 of the fiber optic cable 5 is able to fit snug within the interior cavity 20 of the first mating piece 16 as shown in FIG. 6F. The first mating piece 16 includes connectorized pigtails 4 that extend from the fan-out 7 within the interior cavity 20. To fully house the connectorized pigtails 4, the fan-out 7, and the end 6 of the fiber optic cable 5 the optic fibers 9 may be folded over within the interior cavity 20 of the first mating piece 16 towards the first end 13 of the first mating piece 16. This arrangement is indicated at FIG. 6G. As indicated in FIG. 6H, when the optic fibers 9 are separated by length the optic fibers 9 and the connectorized pigtails 4 can extend the length of the first mating piece 16 of the elongated body 11 of the pulling sleeve 10. Once the optic fibers 9 and the connectorized pigtails 4 are secured within the length of the first mating piece 16 of the elongated body 11 of the pulling sleeve 10 the second mating piece 17 can be aligned to face the first mating piece 16. With the first and second mating pieces 16, 17 facing each other, the alignment guides 24 and alignment openings 25 evenly disposed along the length of the first mating piece 16 are aligned with the corresponding alignment guides 24 and alignment openings 25 evenly disposed along the length of the second mating piece 17. Joining the first and second mating pieces 16, 17 encapsulates the connectorized pigtails 4, the fan out 7, the end 6 of the fiber optic cable 5, and the optic fibers 9 within the interior cavity 20 of the elongated body 11 of the pulling sleeve 10.

Figure 7:
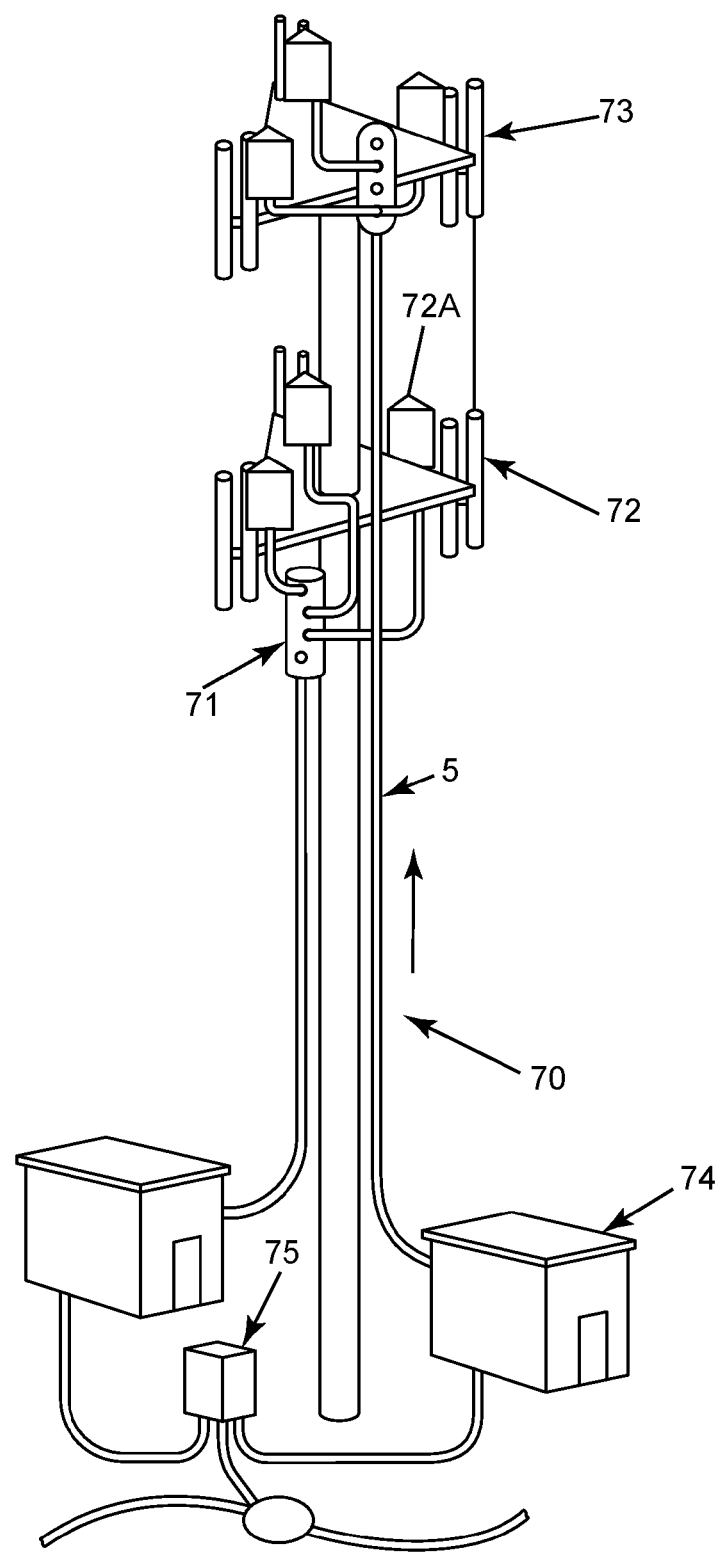
FIG. 7 is a perspective view of a cell tower or a radio tower for which the pulling sleeve is configured to scale.

FIG. 7 depicts a cell tower or a radio tower 70 for which the pulling sleeve 10 is configured to scale. The fiber optic cable 5 may be pulled above ground to a service terminal 71, remote radio unit/head 72, antennae 73 or other structure mounted on the tower 70 at an elevated height. The pulling sleeve 10 may be routed up the tower 70 containing the fiber optic cable 5, as described in FIG. 1-6, up a cell tower from a base station 74 or site support cabinet 75 on the ground through a conduit that runs up the side of the cell tower 70 to a point near the remote radio units 72A and corresponding antennas 73, which can be located over a hundred feet in the air on the cell tower 70. Alternatively, the pulling sleeve 10 containing the fiber optic cable 5, may be routed up a cell tower 70 from a base station 74 or site support cabinet 75 on the ground without the use of a conduit.

It will be appreciated that the various operating environments depicted herein are exemplary and explanatory only and are not restrictive of the broad concepts upon which the examples disclosed herein are based. Therefore, it will be appreciated that the various measuring elements is illustrative in nature and may not be 2014-representative of the exact elements required in determining whether a pump component is approaching an "end of life" condition.

What is claimed is:

1. A pulling sleeve for pulling a cable through a conduit, the pulling sleeve being adapted to be monitored over a plurality of fiber optic connectors terminating optical fibers at an end of a fiber optic cable, the pulling sleeve comprising:

an elongated body defining an interior cavity for receiving the fiber optic connector, the elongated body having a length that extends along a central axis between first and second ends, the first end of the elongated body defining a pulling eye, the elongated body defining a plurality of axially spaced-apart circumferential notches for enhancing flexibility along its length such that the elongated body can conform to a curved path, the elongated body being formed by two mating pieces;

wherein a fan-out is mounted in a pocket within the elongated body at the second end of the elongated body, the fan-out being secured to the cable;

wherein the optical fibers terminated by the fiber optic connectors form connectorized pigtails that extend from the fan out, the fiber optic connectors being mounted between the two mating pieces; and wherein each one of the two mating pieces is elongated and extends from the first end to the second end of the elongated body.

2. The pulling sleeve of claim 1, wherein the elongated body has an axial pulling strength of at least 300 pounds.

3. The pulling sleeve of claim 1, wherein the elongated body has a compressive strength of at least 250 pound force/square inch (440 newtons/cm$^2$).

4. The pulling sleeve of claim 1, wherein the elongated body has a polymeric construction.

5. The pulling sleeve of claim 1, wherein the mating piece are half-pieces.

6. The pulling sleeve of claim 1, wherein the notches each extend completely radially through a wall of the elongated body and partially about a circumference of the elongated body that extends around the central axis.

7. The pulling sleeve of claim 1, wherein the notches extend slightly less than 180 degrees about the circumference.

8. The pulling sleeve of claim 1, wherein axially adjacent notches overlap one another.

9. The pulling sleeve of claim 1, wherein the axially adjacent notches are at least partially circumferentially offset from one another.

10. The pulling sleeve of claim 1, wherein the notches have transverse cross-sectional shapes that are v-shaped.

11. The pulling sleeve of claim 1, wherein the elongated body defines circumferential grooves for receiving cable ties or other tying structure for holding the mated pieces together.

12. The pulling sleeve of claim 1, wherein the elongated body is sufficiently flexible to flex at 90 degrees on a 24 inch radius without being damaged.

13. The pulling sleeve of claim 1, wherein the first end of the pulling sleeve is tapered.

\* \* \* \* \*